Sept. 20, 1960 E. G. RAPP 2,953,691
SPEED CONTROL FOR AUXILIARY POWER SUPPLY SYSTEMS
Filed May 2, 1958
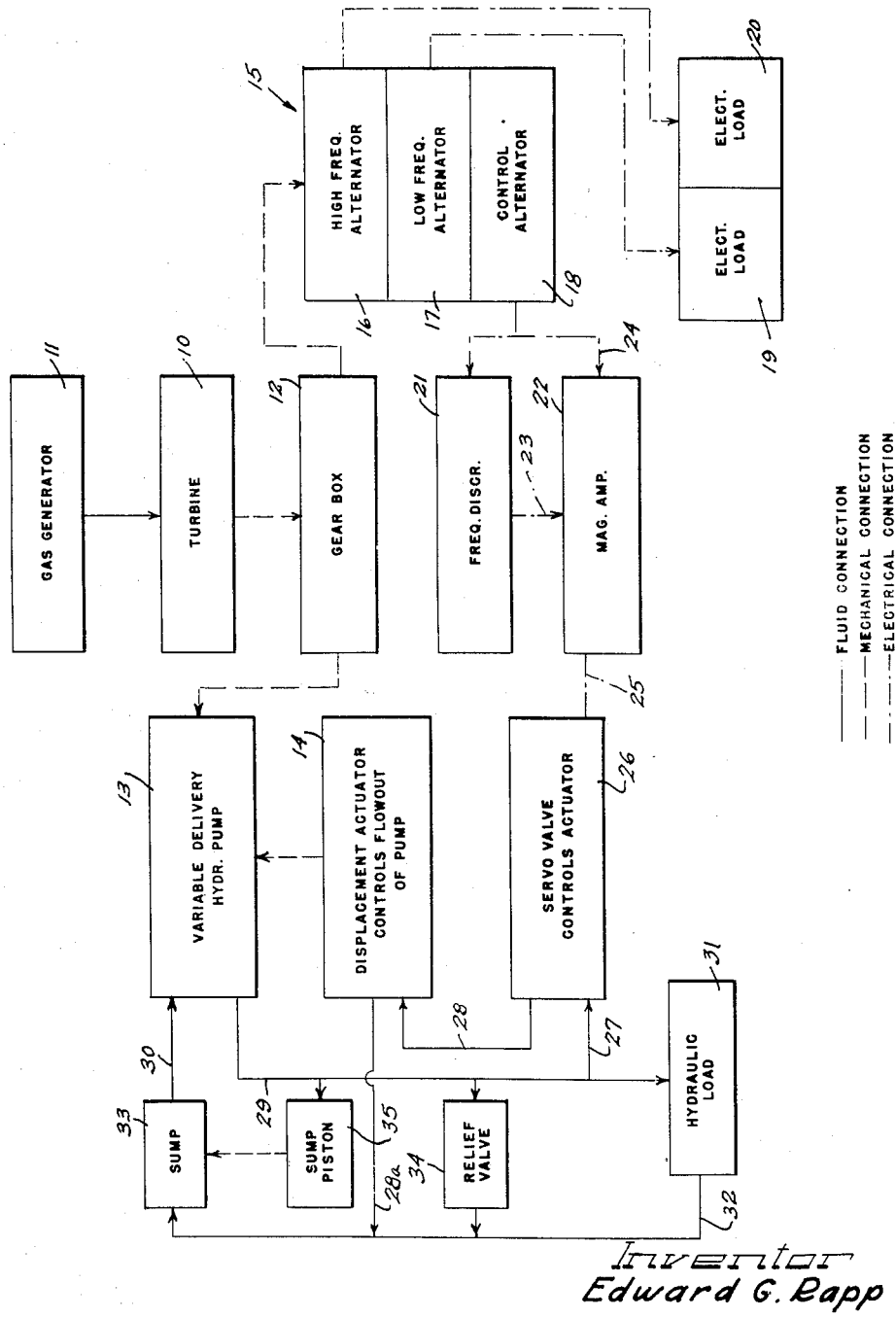
Inventor
Edward G. Rapp United States Patent Office 2,953,691
Patented Sept. 20, 1960

2,953,691

SPEED CONTROL FOR AUXILIARY POWER SUPPLY SYSTEMS

Edward G. Rapp, Cleveland, Ohio, assignor to Thompson Ramo Wooldridge Inc., a corporation of Ohio Filed May 2, 1958, Ser. No. 732,616

6 Claims. (Cl. 290—2)

This invention relates to a hydraulic and electrical power generating system. More particularly, this invention relates to an apparatus for controlling the speed of operation, and hence, the frequency of the output of an electrical alternator forming part of a hydraulic and electrical auxiliary power generating unit suitable for providing power to the control systems and instrumentation of a missile or like vehicle.

In such auxiliary power generating systems, it is important that the frequency of the electrical power supplied be maintained at a relatively constant value. This can be accomplished by controlling the speed of rotation of the alternator which generates the electrical power output.

It is a feature of the present invention to provide a common mechanical drive means such as a turbine for driving both the one or more electrical alternators used and for driving a variable delivery hydraulic pump. The desired speed control is accomplished by dissipating all of the input energy from the turbine not used to maintain the output required of the unit by the missile. The dissipating elements are the variable delivery pump and a pressure regulating relief valve associated therewith. The hydraulic system pressure rise through the pump times the hydraulic flow through the pump determines the total hydraulic energy produced. The flow through the variable delivery pump is controlled in response to a signal indicative of the speed of the alternator so as to deliver just enough flow at regulated pressure to keep this speed constant. Flow excess over the missile requirement passes through the relief valve dissipating its energy into heating of the hydraulic oil. By this invention, then, the variable loading of the turbine by the hydraulic pump is used to control the speed at which the turbine drives the alternator.

It is thus an object of this invention to provide an electrical and hydraulic power generating system in which the speed of rotation of the alternator is controlled by varying the flow through the hydraulic pump to vary the loading on a common means driving both the pump and the alternator.

It is a further object of this invention to provide in an electrical and hydraulic power generating system a speed control apparatus which affords maximum effectiveness of operation with components requiring a minimum of space and weight.

It is a further object of this invention to provide apparatus for utilizing a hydraulic power generating system to control the speed of operation of an associated electrical power generating system.

While the novel and distinctive features of the invention are particularly pointed out in the appended claims, a more expository treatment of the invention, in principle and in detail, together with additional objects and advantages thereof is afforded by the following description and accompanying drawing in which:

On the drawing:

The single figure of the drawing is a block diagram of the system of the present invention.

As shown on the drawing:

In the system shown in the drawing, energy to power a turbine 10 is obtained by expansion of the decomposition products of a gas generator (shown by way of example as a solid-fuel gas generator 11) through the turbine 10. It will of course be understood that gas generator 11 could also be of the types using either liquid or gelatin fuels. The solid-fuel charge in gas generator 11 may, for example, be ignited by a solid propellent igniter and electrical squib combination which, in turn, is fired from ground power. Again it will be understood that any other suitable igniter such as a spark plug could be used depending upon the type of fuel used. The turbine is preferably a single stage, axial flow impulse-type machine that turns at approximately 24,000 r.p.m. The turbine is mechanically connected to drive a gearbox 12 which, in turn, is mechanically connected to drive both a variable delivery hydraulic pump 13 and the common drive shaft of a group of electrical alternators 15.

The alternator 15 has a plurality of stages shown, for example, as the three energy-producing sections which are, in effect, separate alternators having rotors mounted on a common shaft. Thus, alternator 16 is a relatively high frequency output machine which in one particular embodiment of the invention is adapted to supply 600 volt-amperes of single phase, 2,400 cycle power. Alternator 17, on the other hand, in this particular embodiment is adapted to provide 100 volt-amperes of three phase 400 cycle power, while the remaining alternator 18 furnishes control power only at a frequency of 2,400 cycles per second for a purpose to be described below. The alternator assembly 15 may, for example, be of the type disclosed in detail in the copending application of Robert L. Anderson, entitled "Alternator Assembly," Serial Number 656,646, filed May 2, 1957, and assigned to the same assignee as the present application. In the above-noted Anderson application, the turbine directly drives the alternator shaft. It will, of course, be understood that in the present invention, this arrangement could be used but that it is preferred to provide a separate turbine which drives both the alternator shaft and the hydraulic pump through any suitable gearing arrangement such as the gear-box 12. If the turbine is constructed integrally with the alternator unit 15 as in the above-mentioned Anderson application, it will, of course, be understood that any suitable mechanical power take off would be provided from the shaft shown in Anderson so as to also drive the variable delivery hydraulic pump 13 shown in the drawing. It will, of course, be understood that the output connections from the alternators shown in the above-noted Anderson application are in the present invention changed to conform with the showing in the single figure hereof in order to achieve the speed control technique afforded by the present invention.

In the single figure shown in the drawing, it will be noted that fluid connections are indicated by a solid line, mechanical inter-connections are indicated by a dashed line and electrical connections are indicated by a dash-and-dot line. Thus, the high frequency alternator 16 and the low frequency alternator 17 of the alternator assembly 15 have their outputs connected to electrical loads or utilization circuits 19 and 20, respectively. The output of control alternator 18, however, is applied both to a frequency discriminator 21 and a magnetic amplifier 22. The frequency discriminator 21 is preferably, but not necessarily, of the stagger-tuned type which provides an output signal over electrical line 23 to the magnetic amplifier 22. The magnitude and polarity of the signal applied over line 23 are a direct measure of the deviation from a predetermined center frequency at which it is desired to maintain the electrical output of control alternator 18. Operating power for the magnetic amplifier 22 may also be derived from the control alternator 18 over line 24. Suitable circuit diagrams of a frequency discriminator and magnetic amplifier arrangement which may be used as the circuits 21 and 22 hereof are, for example, shown in the copending application of Fred H. Guth and John Donald Blake, entitled "Power Generator Control System," Serial Number 639,765, filed February 12, 1957, and assigned to the same assignee as the present application. It will, however, be understood that neither the details of the particular alternator structure nor the details of the particular frequency discriminator or magnetic amplifier circuit used are critical to the present invention. The technique of the present invention may be applied to any system in which a mechanical driving means such as the turbine 10 has a mechanical output which drives both one or more alternators, the frequency of which is to be controlled and which also drives a variable delivery hydraulic pump. It is then only necessary to provide any convenient means for deriving an electrical signal having some characteristic which is a variable and which in its variation affords a measure of the deviation of the speed of rotation or equivalently of the frequency of the output of the alternator. This signal is applied over electrical line 25 to a servo valve 26, which, in turn, controls, in response to this signal, the displacement actuator 14 which is mechanically connected to control the flow-out of the variable delivery hydraulic pump 13.

The variable delivery hydraulic pump may be any one of a large number of suitable commercially available pumps, the flow-rate of all of which can be varied by any suitable displacement actuator. Such pumps are, for example, shown in U.S. Patent No. 1,742,215, issued to R. J. S. Pigott on January 7, 1930, or in U.S. Patent No. 1,990,750, issued to the same inventor on February 12, 1935, or in U.S. Patent No. 2,052,419, issued to C. A. Moore, et al., on August 25, 1936. The electrically controlled servo valve 26 may derive hydraulic pressure for operating the displacement actuator 14 from an input line 27 and a return line 28. Line 27 is connected, via line 29, to the output of the hydraulic pump 13. Line 28 is connected as an input to the displacement actuator 14, the hydraulic return from which is via line 28a to the main return line 32 to sump 33 and pump 13. It will, of course, be understood that servo valve 26 could, alternatively, be all electric in its operation and might, for example, be a proportional solenoid. As shown in the drawing, the degree of actuation of the displacement actuator 14 is, of course, controlled by electrically actuating the servo valve 26 which controls the flow of hydraulic fluid therethrough.

Thus, line 27 is connected to the line 29 which is the main output line from pump 13 whereas line 28 is connected through actuator 14 and sump 33 to line 30 which is the main input line to the variable delivery hydraulic pump 13. Tracing the hydraulic circuit, it will be noted that output line 29 from pump 13 is connected to the main hydraulic load 31 which may, for example, be the control mechanism or other instrumentation of the missile or other apparatus in which the system is used. A return line 32 connects the hydraulic load 31 to a sump 33 which is, in turn, connected by the input line 30 to the pump 13.

In accordance with the present invention, a pressure regulating relief valve 34 is connected between the output line 29 of pump 13 and the return line 32 to sump 33 in parallel with the hydraulic load 31 in order to maintain a constant pressure at the output of pump 13 and to by-pass any excess hydraulic flow not required by the utilization hydraulic load 31. In one particular embodiment of the invention, for example, the hydraulic system pressure may conveniently be maintained at approximately 3,000 p.s.i. by the pressure relief valve 34. Pump inlet pressure may similarly be maintained at a suitable constant value (which may be 60 p.s.i. in the aforementioned exemplary embodiment) by pressurizing sump 33 with high pressure hydraulic fluid through a stepped piston arrangement 35. Alternatively, the stepped piston may be replaced by pressure or spring loading of the sump. Thus, the pump 13 operates at a cavitating condition during acceleration until the sump receives pressurization from the pump discharge. Solids may conveniently be removed from the hydraulic fluid by a 10-micron stainless steel filter which may, if desired, be incorporated with the sump and relief valve in an integral assembly.

It is thus seen that the system is driven by an essentially constant energy source represented by the solid fuel gas generator which drives the turbine and that the speed control of the rotating machinery is of the parasitic load type in which excess energy is dissipated by the hydraulic system. In one practical embodiment, the gear train of gearbox 12 may be enclosed in a central housing which forms the gearcase and provides the main structural support for the power supply assembly. Mounting provisions for the turbine assembly, alternator, pump, sump and relief valve, gas generator, hydraulic actuators, and electrical controls may all be incorporated on this housing. While such a construction permits a compact assembly which may be assembled, attested and installed in a missile as an integral unit, it will, of course, be understood that the assembly details are not essential to the present invention. As noted above, the alternator speed is nominally 24,000 r.p.m. and thus could be driven directly from the turbine. However, in practice, the packaging requirements and a minimum center-to-center distance between the pump and alternator render the use of a gearset between the turbine and the alternator desirable. Stepdown gearing reduces the drive speed at the mechanical input to pump 13 to approximately 12,000 r.p.m. in the above-noted preferred practical embodiment.

In this exemplary embodiment, the pump 13 desirably provides 3.23 horsepower of hydraulic power to the missile, corresponding to a flow of 1.85 g.p.m of hydraulic fluid at 3,000 p.s.i. The hydraulic system is capable of absorbing more than this amount of power in its capacity as a parasitic control, however, and the maximum value for this parasitic power depends upon the choice of pump size.

Alternator frequency or system speed control is accomplished by parasitic loading of the hydraulic portion of the power supply. As alternator frequency strays from the design value, the frequency error is sensed by the speed control frequency discriminator 21, which then directs the pump servo valve 26 to change the pump displacement. Hydraulic system or pump discharge pressure is, as noted above, maintained at approximately 3,000 p.s.i. by the relief valve. Therefore, hydraulic horsepower becomes a function only of flow or pump displacement. Since the parasitic load required at the start is small, the variable delivery pump will be feathered by the speed control to low capacity and low horsepower. As the energy available increases, the pump displacement and thus the flow rate is increased to provide additional parasitic capacity. Any suitable ground power starting equipment may be provided for the gas generator, the alternators, and the hydraulic pump.

As has been noted above, the speed or frequency control is achieved through the use of a frequency discriminator which senses any deviation of speed of the alternator or other frequency sensitive device from a predetermined value and provides a signal which may be amplified by the magnetic or any other suitable amplifier to actuate a servo valve controlling the displacement of the hydraulic pump. Any deviation in the frequency of the control alternator (which is rotated on a common shaft with all other alternators) from the predetermined reference frequency results in a signal to the pump servo valve, thus changing the hydraulic horsepower delivered by the variable delivery pump. This change in power results in an unbalanced torque at the turbine shaft causing a change in system speed or frequency. Thus, the hydraulic horsepower or torque required by the pump is varied to compensate for any change in electrical or hydraulic loads or input energy from the gas generator, thereby maintaining constant alternator output frequency.

The pump control characteristic may be either proportional or integral. The proportional system, which is preferred in the above-noted exemplary embodiment, is easily capable of holding the output frequency to within plus or minus 1% of rated speed. The integral system is capable of holding even closer steady state performance, but more care must be taken to insure system stability. This is because the open loop phase margin is more critical than for a proportional-type system. If desired, suitable stabilizing networks may be included in the frequency discriminator to compensate for problems of this type. The component and loop gains used in the preferred proportional system of the present invention, however, are such that the turbine characteristic parameters drop out of the final over-all transfer characteristic. Independence of the system performance from the turbine or gas generator charactristics is desirable since the resulting system is highly linear and predictable as long as the power output available from the turbine is sufficient to support the loads and losses in the system.

While the principles of the invention have now been made clear, there will be immediately obvious to those skilled in the art many modifications in structure, arrangement, proportions, the elements and components used in the practice of the invention and otherwise, which are particularly adapted for specific environments and operating requirements without departing from those principles. The appended claims are, therefore, intended to cover and embrace any such modifications within the limits only of the true spirit and scope of the invention.

I claim as my invention:

1. Apparatus for controlling the speed of rotation of an alternator comprising, at least one alternator the speed of rotation of which is to be controlled, a variable delivery hydraulic pump, a mechanical drive means connected to actuate both said pump and said alternator, means to derive an electrical signal having a characteristic which is a measure of the deviation of the speed of said alternator from a predetermined value, means responsive to said signal to vary the flow delivery rate of said pump, means to maintain a suitable hydraulic pressure at the input to said pump, and energy dissipating means to maintain a constant hydraulic pressure at the output of said pump whereby the energy required from said common drive means to drive said pump is determined only by said flow delivery rate of said pump, said required energy thereby loading said drive means to maintain the speed of rotation of said alternator at said predetermined value.

2. Power generating and control apparatus comprising, a variable delivery hydraulic pump, first and second electrical alternators each having a rotor mounted on a common shaft, a turbine connected to drive both said pump and said shaft, means to derive an electrical signal having a characteristic which is a measure of the deviation of the speed of rotation of one of said alternators from a predetermined value, servo means responsive to said signal to vary the flow delivery rate of said pump, input and output lines connecting said variable delivery pump to an hydraulic load, a sump in said input line immediately adjacent said pump, means to maintain a suitable hydraulic pressure in said sump, a pressure regulating relief valve connected between said input and said output lines in parallel with said hydraulic load to maintain a constant pressure at the output of said pump whereby the energy required from said turbine to drive said pump is determined only by said flow delivery rate of said pump, said required energy thereby loading said turbine to control the speed of rotation of both of said alternators.

3. An auxiliary hydraulic and electrical power generating system adapted for use in a missile comprising, a turbine, gas generating means connected to drive said turbine, first and second electrical alternators each having a rotor mounted to be driven by a common shaft, a variable delivery hydraulic pump, gear means connecting said turbine to drive both said hydraulic pump and said alternator shaft, a frequency discriminator connected to produce an output signal having a characteristic proportional to the deviation of the speed of rotation of one of said alternators from a predetermined speed, control means connected to vary the flow delivery rate of said hydraulic pump, servo valve means connected to actuate said control means, amplifier means connected to apply said output signal of said frequency discriminator to control said servo valve means, input and output lines connecting said variable delivery hydraulic pump to an hydraulic load, a sump in said input line immediately adjacent said pump, means to maintain a constant hydraulic pressure in said sump and at the input to said variable delivery pump, a pressure regulating relief valve connected between said input and said output lines in parallel with said hydraulic load, said relief valve being connected to maintain a constant pressure at the output of said hydraulic pump whereby the energy required from said turbine to drive said pump is determined only by said flow delivery rate of said pump, said required energy thereby loading said turbine to control the speed of rotation of said alternators.

4. An auxiliary hydraulic and electrical power generating system adapted for use in a missile comprising, a plurality of alternators mounted to be driven by a common drive shaft the speed of which is to be controlled, a variable delivery hydraulic pump, means connected to drive both said pump and said alternator drive shaft, means to derive an electrical signal having a characteristic which is a measure of the deviation of the frequency of the output of one of said alternators from a predetermined value, means responsive to said signal to vary the flow delivery rate of said pump, means to maintain a constant hydraulic pressure at the input to said pump, an energy dissipating relief valve means connected to maintain a constant hydraulic pressure at the output of said pump whereby the energy required from said drive means to drive said pump is determined only by said flow delivery rate of said pump, said required energy thereby loading said drive means to maintain the speed of rotation of said alternator shaft at said predetermined value.

5. Power generating apparatus comprising, an electrical alternator, a turbine connected to drive said alternator, said turbine also being connected to supply energy to a parasitic hydraulic load, means responsive to deviations of the frequency of the output of said alternator from a predetermined frequency to vary said parasitic hydraulic load on said turbine so as to maintain said output frequency substantially constant at said predetermined frequency.

6. An auxiliary hydraulic and electrical power generating system adapted for use in a missile comprising, a turbine, gas generating means connected to drive said turbine, a high frequency alternator, a low frequency alternator, and a control alternator, each of said alternators having a rotor mounted to be driven by a common drive shaft, a variable delivery hydraulic pump, gear means connecting said turbine to drive both said hydraulic pump and said common alternator drive shaft, a frequency discriminator connected to produce an output signal having a characteristic the magnitude of which is proportional to deviations of the frequency of the output of said control alternator from a predetermined frequency, control means connected to vary the flow delivery rate of said hydraulic pump, hydraulic actuated servo valve means connected to actuate said control means, a magnetic amplifier connected to apply said output signal from said frequency discriminator to control said hydraulic servo valve means, input and output lines connecting said variable delivery hydraulic pump to an hydraulic load, a sump in said input line immediately adjacent said pump, means to maintain a suitable hydraulic pressure in said sump and at the input to said variable delivery pump, a pressure regulating relief valve connected between said input and said output lines in parallel with said hydraulic load, said relief valve being connected to maintain a constant pressure at the output of said hydraulic pump whereby the energy required from said turbine to drive said pump is determined only by said flow delivery rate of said pump, said required energy thereby loading said turbine to control the speed of rotation of said alternator drive shaft and thereby maintain the frequency of the output of said alternator substantially constant at said predetermined value.

References Cited in the file of this patent

UNITED STATES PATENTS

| | | |
|---|---|---|
| 1,766,548 | Schnitzer | June 24, 1930 |
| 1,873,982 | Rusterholz | Aug. 30, 1932 |
| 2,760,083 | Rau et al. | Aug. 21, 1956 |